(12) United States Patent
DeCusatis et al.

(10) Patent No.: US 9,300,528 B2
(45) Date of Patent: Mar. 29, 2016

(54) TRILL NETWORK WITH MULTIPATH REDUNDANCY

(71) Applicant: International Business Machines Corporation, Armonk, NY (US)

(72) Inventors: Casimer M. DeCusatis, Poughkeepsie, NY (US); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 14/105,976

(22) Filed: Dec. 13, 2013

(65) Prior Publication Data

US 2015/0172100 A1   Jun. 18, 2015

(51) Int. Cl.
*H04L 12/24* (2006.01)
*H04L 12/44* (2006.01)
*H04L 12/707* (2013.01)
*H04L 12/705* (2013.01)
*H04L 12/721* (2013.01)

(52) U.S. Cl.
CPC ............ *H04L 41/0668* (2013.01); *H04L 12/44* (2013.01); *H04L 41/0816* (2013.01); *H04L 45/18* (2013.01); *H04L 45/24* (2013.01); *H04L 45/66* (2013.01)

(58) Field of Classification Search
CPC ............ H04L 41/0677; H04L 49/3009; H04L 49/351; H04Q 11/0005; H04Q 2011/0052
See application file for complete search history.

(56) References Cited

U.S. PATENT DOCUMENTS

| 8,098,574 | B2 * | 1/2012 | Southworth et al. | 370/217 |
| 8,989,049 | B2 * | 3/2015 | Yang et al. | 370/255 |
| 9,008,095 | B2 * | 4/2015 | Kapadia et al. | 370/392 |
| 2012/0106339 | A1 | 5/2012 | Mishra et al. | |
| 2012/0320926 | A1 | 12/2012 | Kamath et al. | |

FOREIGN PATENT DOCUMENTS

JP   2012209928 A   10/2012

OTHER PUBLICATIONS

International Search Report and Written Opinion for International Application No. PCT/JP2014/005344; International Filing Date: Oct. 20, 2014, Date of Mailing: Jan. 20, 2015; 7 pages.

(Continued)

*Primary Examiner* — Chandrahas Patel
(74) *Attorney, Agent, or Firm* — Cantor Colburn LLP; Steven Chiu

(57) ABSTRACT

Embodiments include a system for a multilevel network with inter-layer multipath redundancy between a first network layer of leaf switches and a second network layer of spine switches. Each leaf switch is connected to multiple spine switches to provide multiple inter-layer communication paths between the leaf switches and the spine switches. Each spine switch is assigned a common Layer 2 and 3 network address, while each leaf switch is configured with an inter-layer link selection protocol to selectively connect only one active inter-layer link between the leaf switch and the wide area layer while disabling all other available inter-layer links between the leaf switch and the wide area layer. Alternative inter-layer links is thus activated without requiring the leaf switch to be configured with a new address for the alternate inter-layer link or relying on any multipath functionality implemented within the spine switches.

5 Claims, 6 Drawing Sheets

(56) References Cited

OTHER PUBLICATIONS

Nakashima et al., A Fast Forwarding Database Update Method by Proper Address Assginment for InfiniBand, IPSJ SIG Technical Report, Feb. 2011, pp. 1-7.

Nakayama et al, Weighted fairness in access networks with layer-2 routing protocols, IEICE Technical Report, vol. 113, No. 114, Jun. 27, 2013, pp. 41-46.

Shenoy, Nirmala, "A Meshed Tree Algorithm for Loop Avoidance in Switched Networks", Eighth International Conference on Networking and Services (ICNS 2012), Mar. 25-30, 2012, Published by ThinkMind, pp. 52-56.

Van Der Pol, Ronald et al, "Multipathing with MPTCP and Open Flow", SCinet Research, Nov. 15, 2012, California Institute of Technology, 8 Pages.

* cited by examiner

TRILL NETWORK WITH MULTIPATH REDUNDANCY

BACKGROUND

The present invention relates generally to computer network communication systems and, more specifically, to a multilevel network providing inter-layer multipath redundancy between switches of a first network layer and a second network layer.

Ethernet local area network (LAN) communication networks have been deployed to provide local area connectivity among a number of connected devices as well as wide area access, such as Internet connectivity. Enterprise applications have traditionally required high availability of local devices over the LAN. Ethernet topologies have therefore incorporated high levels of interconnection and redundancy providing multiple paths between local devices and LAN networks. Providing high ethernet reliability typically utilizes the spanning tree protocol (STP), which is a network protocol ensuring loop-free transmission through any bridged ethernet LAN. STP prevents bridge loops while allowing the network topology to include spare (redundant) links serving as automatic backup paths if an active link fails without the need for manual enabling/disabling of the backup links. The spanning tree approach in the ethernet protocol typically creates a transmission path of layer-2 bridges while disabling all potential (redundant) links that are not part of the spanning tree, leaving a single active layer-2 path between any two network nodes. The transparent interconnection of lots of links (TRILL) protocol has also been implemented to enable multipath connectivity either within a data center or among gateways providing wide area network accessed over the Internet. While TRILL also enables a form of Layer 2 multipathing, it does not currently include Layer 3 multipathing solutions. This is a concern when designing high availability networks with redundancy, since TRILL cannot provide the redundant Layer 3 pathing typically assumed by other networking layers; for example, protocols such as VRRP (virtual router redundancy protocol) only allow for one default active Layer 3 gateway router, assuming redundancy will be implemented elsewhere in the network protocols.

SUMMARY

Embodiments include a system for providing a multilevel network with inter-layer multipath redundancy within a first and second switching layer of a local area networks (commonly known as a leaf-spine architecture) or between a local area layer and a wide area layer of the network. A number of computing devices are addressed in a multilevel network that includes a local area layer and a wide area layer. A number of leaf switches are configured at a first network layer to provide local area network access among the computing devices. In addition, a number of spine switches are configured at a second network layer to provide connectivity between large numbers of computing devices or access to the Internet. Each leaf switch is connected to multiple spine switches to provide multiple inter-layer communication paths between the leaf switches of the local area layer and the spine switches. Each spine switch is assigned a common network address, while each leaf switch is configured with an inter-layer link selection protocol to selectively connect only one active inter-layer link between the leaf switch and other network layers while disabling all other available inter-layer links between the leaf switch and other network layers. More specifically, when a leaf-spine network is constructed using Layer 3 TRILL switches, each Layer 3 TRILL switch would be configured with the same IP address and MAC address for the default Layer 3 gateway. When sending a packet, the server resolves the Layer 3 gateway to this IP and MAC address, which is now available on all links (since each TRILL spine switch originates this MAC address as if it were the only one on the network). In order to determine which Layer 3 spine switch actually receives the traffic flow, an equal cost multi-path (ECMP) hash is performed at the Layer 2 leaf switch.

In response to detecting a failure of an active inter-layer link, the affected leaf switch activates an alternative inter-layer link between the particular leaf switch and the next layer of the network while disabling all other available inter-layer links between the leaf switch and the next layer of the network. In other words, when a failure is detected affecting the leaf-spine connectivity, the leaf switch will re-hash to another Layer 3 gateway. The alternative inter-layer link is thus activated without requiring the leaf switch to be configured with a new address for the alternate inter-layer link or relying on any multipath functionality implemented within the network layers above the leaf switch. A similar approach can be used to provide high availability for other appliances attached to the network, such as firewalls or load balancers. Further, to reduce Layer 3 bottlenecks and manage the size of network failure domains, we preferentially include the ability to limit the number of hosts assigned per virtual LAN segment.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
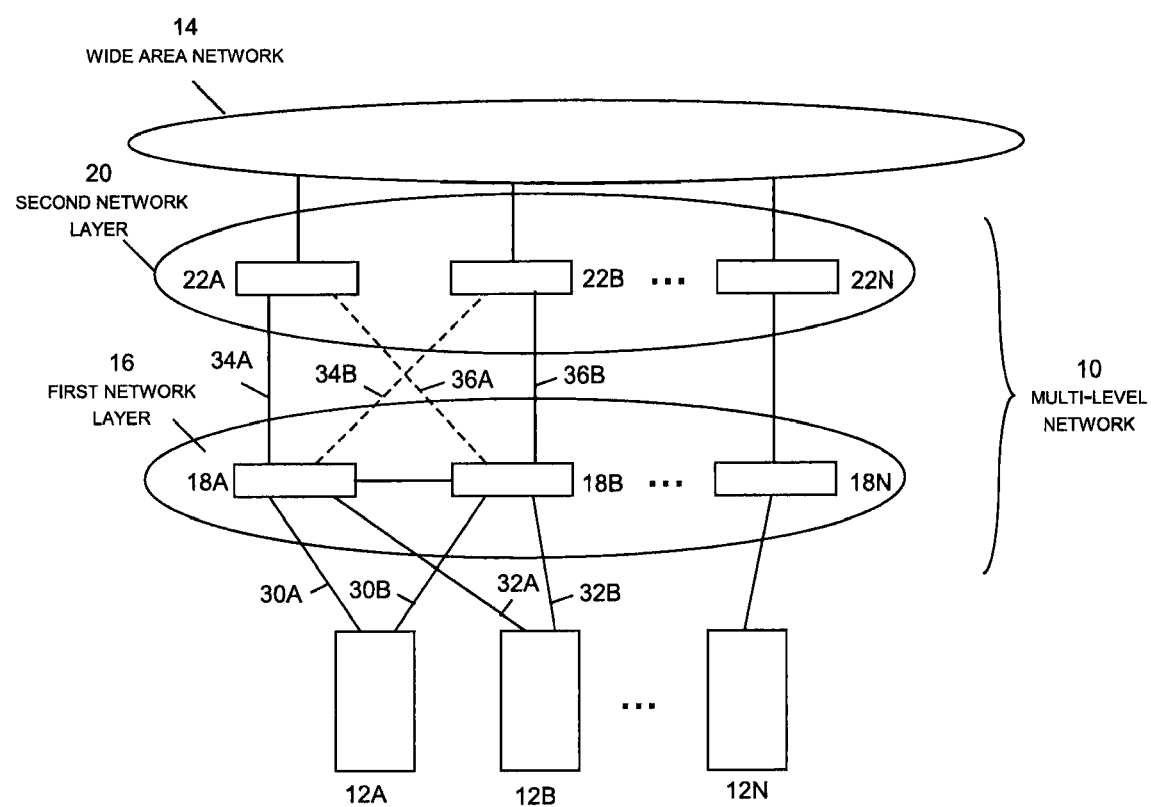
FIG. 1 depicts an multilevel network topology utilizing-2 leaf switches to interconnect local devices in a local area layer and spine switches in a wide area layer to access a wide area network in accordance with a first embodiment.

Embodiments of the invention may be realized in a multilevel network topology including a local area layer of leaf switch and a wide area layer of spine switches. For example, an ethernet embodiment the local area layer of leaf switch may be configured at ethernet layer-2 and the wide area layer may include transparent interconnection of lots of links (TRILL) spine switches configured at ethernet layer-3. To allow the leaf switches to communicate with all of the spine switches without having to reconfigure the IP addresses at the leaf switches, all of the TRILL spine switches may be assigned the same IP address and a common MAC address. To prevent multiple inter-layer communication paths and loops, each leaf switch implements an inter-layer link selection protocol, such as equal-cost multipath (ECMP), to activate a single inter-layer link from the leaf switch while disabling all other available inter-layer links between the leaf switch and the wide area layer. Alternative inter-layer links are thus activated in response to link failures without requiring the leaf switch of the local area layer to be configured with a new address for the alternate inter-layer link or relying on any multipath functionality implemented within the TRILL spine switches of the wide area layer. However, the leaf switch typically requires initialization with the newly connected leaf switch to prevent unauthorized access to the network through the wide area layer.

For example, to implement inter-layer multipath connectivity in an ethernet embodiment, all of the layer-3 spine switches are assigned the same IP and MAC addresses while the layer-2 leaf switches implement and ECMP routing protocol to select a single active inter-layer link among. ECMP hashing is utilized to automatically switch to a new inter-layer link upon loss of the existing link. The use of ECMP unique link selection allows all of the layer-3 TRILL spine switches to be assigned a common MAC and TCI-IP addresses, which allows any TRILL spine switch to handle communications received from any layer-2 leaf switch once an inter-layer connection has been established in accordance with the ECMP protocol. As a result, inter-layer multipath connections are enabled between the layer-2 leaf switches and the layer-3 spine switches utilizing only the ECMP protocol implemented on the layer-2 leaf switches without requiring any programming or protocol changes to the layer-3 TRILL spine switches.

In this embodiment, the ethernet communication protocol provides LAN connectivity to local devices utilizing MAC addresses as well as Internet access utilizing IP addresses. The ethernet protocol defines a message header referred to as the Open System Interconnect (OSI) Stack in which LAN connectivity is typically implemented at the Layer-2 "Datal ink" level, while Internet connectivity is implemented at the Layer-3 "Network" level. In the standard OSI stack, a device is accessed on the LAN network utilizing a MAC address, while also being addressed on the Internet utilizing a IP address. To accommodate both device addresses, the MAC address is typically assigned to the layer-2 (Data link) position in the OSI stack, while the IP address is assigned to layer-3 (Network). Embodiments of the present invention provide inter-layer multipath reliability between the layer-2 leaf switches and the layer-3 spine switches defined within the OSI Stack in the ethernet protocol.

Enterprise applications have traditionally required high availability of local devices on the ethernet LAN. layer-2 network topologies have therefore incorporated high levels of interconnection and redundancy providing multiple paths between local devices and been LAN networks. Providing high reliability to the local devices conventionally relies on the spanning tree protocol (STP), which is a network protocol ensuring loop-free transmission through any bridged ethernet LAN. STP prevents bridge loops while allowing the network to include spare (redundant) links serving as backup paths. STP enables automatic backup link switching when an active link fails without the need for manually disabling the original link and enabling the backup link. The spanning tree approach therefore results in a signal active transmission path of layer-2 bridges while disabling all potential (redundant) links that are not part of the spanning tree, leaving a single active point-to-point path between any two network nodes. A redundant path is automatically switched into connectivity in response to loss of the active link.

As Internet access has become an indispensable resource for many applications, the transparent interconnection of lots of links (TRILL) protocol has been developed to enable multipath connectivity to IP addressed devices. While it would be advantageous to incorporate the TRILL network into an ethernet LAN, the TRILL protocol provides no functionality for multipath access to the TRILL devices from the ethernet. While the TRILL protocol provides multipath connectivity among the TRILL switches, it presumes that each TRILL switch will be directly connected to an Internet gateway and therefore does not provide functionality for multipath access from a lower level network to the Trill switches. Thus connecting a TRILL network to an ethernet at layer-3 of the OSI Stack using the conventional TRILL protocol would leave a single, non-redundant path in the inter-layer link between layer-2 and layer-3 of the network.

Altering the TRILL network programming or protocol would be disruptive to the standard that has been developed for TRILL operations. The present invention therefore solves the problem by connecting the TRILL switches to an ethernet without having to alter the TRILL protocol implemented by the layer-3 devices. Leaf switches are assigned to layer-2 of the ethernet protocol, TRILL spine switches are assigned to layer-3 of the ethernet protocol, while multipath inter-layer links are connected between the layer-2 leaf switches and the layer-3 spine switches. Inter-layer multipath connectivity is implemented through the ethernet protocol by assigning the same IP and MAC addresses to all of the layer-3 spine switches while utilizing ECMP hashing at the layer-2 leaf switches to select a single active inter-layer link while disabling all non-selected inter-layer links. ECMP hashing is utilized to automatically switch to a new inter-layer link upon loss of the existing inter-layer link, which provides multipath redundancy while ensuring that only a single inter-layer link is active at a time.

The use of ECMP link selection at layer-2 allows all of the layer-3 TRILL spine switches to be assigned the same MAC and TCI-IP addresses. This allows any TRILL spine switch to handle communications received from any layer-2 leaf switch once an inter-layer connection has been established in accordance with the ECMP protocol. As a result, inter-layer multipath connections are enabled between the layer-2 leaf switches and the layer-3 spine switches utilizing only the ECMP protocol implemented on the layer-2 leaf switches, and without requiring any programming or protocol changes to the layer-3 TRILL spine switches.

Turning now to the figures, FIG. 1 depicts a multilevel computer network 10 providing local devices 12A-12N with local area network connectivity as well as connectivity to the internet 14. In this particular example, the local devices may include servers, workstations, and so forth. The local area layer 16 includes a number of leaf switches 18A-18N providing the local devices 12A-12N with multipath local area network access within the local area 16. The computer network 10 may implement a spanning tree protocol to provide the multipath local area network access within the local area 16. The wide area layer 20, on the other hand, includes a number of spine switches 22A-22N providing the local devices 18A-18N with multipath access to the Internet 14. For example, the spine switches 22A-22N may be Internet gateways providing the local devices 12A-12N with multipath connectivity within the wide area layer 20 utilizing the TRILL protocol. According to an embodiment, inter-layer multipath connectivity is implemented between the local area layer 16 and the wide area layer 20.

Figure 2:
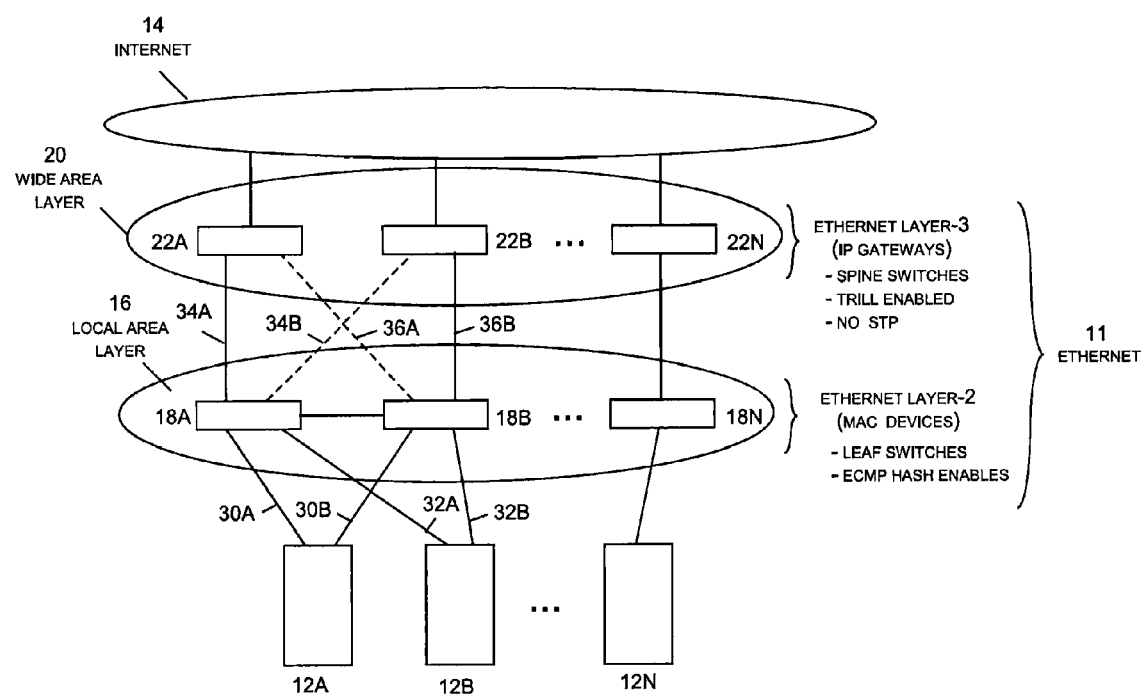
FIG. 2 depicts an ethernet topology utilizing layer-2 leaf switches to interconnect local devices in a local area layer and layer-3 TRILL spine switches in a wide area layer to access the Internet in accordance with a second embodiment.

FIG. 2 depicts an multilevel ethernet network 11 providing local devices 12A-12N with local area network connectivity as well as connectivity to the Internet 14. In this particular example, the leaf switches 18A-18N configured at ethernet layer-2 provide the local devices 12A-12N with multipath local area network access within the local area 16. The ethernet 11 may implement an STP protocol to provide the multipath local area network access within the local area 16. The wide area layer 20, on the other hand, includes a number of spine switches 22A-22N configured at ethernet layer-3 providing the local devices 18A-18N with multipath access to the Internet 14. For example, the spine switches 22A-22N may be Internet gateways providing the local devices 12A-12N with multipath connectivity within the wide area layer 20 utilizing the TRILL protocol. In this embodiment, inter-layer multipath connectivity is implemented between the local area layer 16 configured at ethernet layer-2 and the wide area layer 20 configured at ethernet layer-3.

Figure 3:
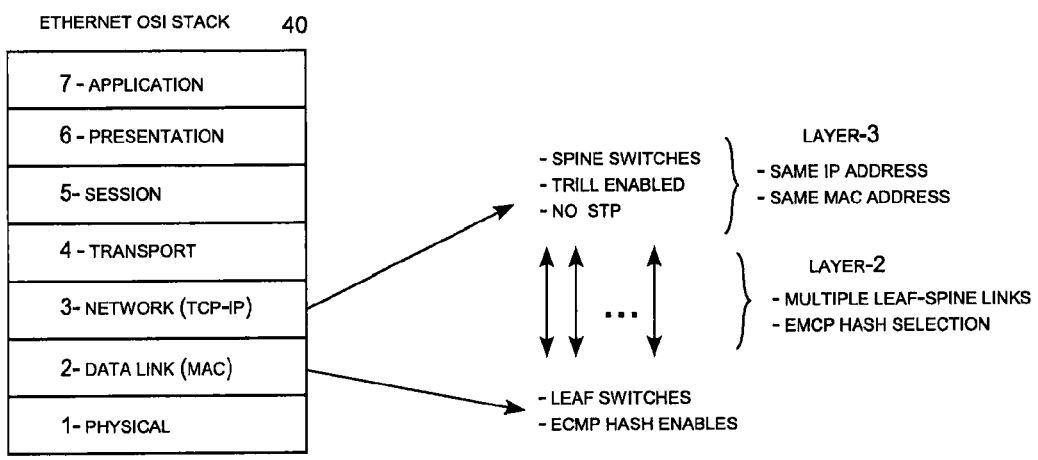
FIG. 3 depicts a protocol for configuring the ethernet topology of FIG. 2 in accordance with an embodiment.

FIG. 3 depicts an ethernet open system interconnect (OSI) Stack 40 for configuring the multilevel network 11 of FIG. 2, which is an ethernet in this example. The leaf switches 18A-18N of the local area layer 16 are assigned to layer-2 (Data link layer) in the ethernet OSI Stack 40, while the TRILL spine switches 22A-22N of the wide area layer 20 are assigned to layer-3 (Network layer) of the ethernet OSI stack 40. In accordance with the ethernet protocol, MAC addresses are assigned to the local devices 12A-N as well as the leaf switched 18A-18N forming the local area layer 16 at layer-2 of the OSI Stack 40. In addition, IP addresses are assigned to the TRILL gateways 22A-22N of layer-3 forming the wide area layer 20. The TRILL gateways 22A-22N may also be assigned MAC addresses.

Referring again to FIG. 2, multiple paths or links are connected between the local devices 12A-N and the layer-2 routers as represented by the pair of links 30A, 30B between the local device 12A and the leaf switches 18A and 18B, respectively. Similarly, a pair of links 32A, 32B is connected between the local device 12B and the leaf switches 18A and 18B, respectively. Multiple paths or links are also connected between the layer-2 routers and the layer-3 gateways, as represented by the pair of links 34A, 34B between the leaf switch 18A and the TRILL spine switches 22A and 22B, respectively. Similarly, a pair of links 36A, 36B is connected between the leaf switch 18B and the spine switches 22A and 22B, respectively. It will be understood that this is a simplified depiction of multipath connectivity that typically includes a large number of multipath connections between local devices, the local area layer, and the wide area layer of the multilevel network in what may be a sophisticated network topology. Nevertheless, it will also be appreciated that the techniques of the embodiment described with reference to the simple multi-path connection illustrated in the figure can be replicated and generalized to any number of multipath inter-layer links.

It will be appreciated that the layer-2 devices 18A-18N are typically configured with the spanning tree protocol to prevent bridge loops from occurring among the layer-2 devices of the local area layer 16 in accordance with the conventional ethernet protocol. For example, this may include a spanning tree protocol (STP) to select among the available links at the layer-2 level when implementing automatic replacement of a lost link with an available redundant link. It will be further appreciated that the layer-3 devices 22A-22N are configured with the TRILL protocol to prevent bridge loops from occurring among the layer-3 devices of the wide area layer 20 in accordance with the conventional TRILL protocol. However, there is no conventional mechanism to provide inter-layer multipath connectivity between the local area layer 16 and the wide area layer 20. According to an embodiment, multipath connectivity is implemented between the local area layer 16 and the wide area layer 20 through ECMP hashing implemented by the layer-2 devices 18A-18N to select among the available inter-layer links between layer-2 and layer-3, including the inter-layer links 34A-34B and 36A-36B in this particular example.

According to the embodiment, ECMP hashing is utilized to select among the available inter-layer links between the layer-2 and layer-3 devices when implementing automatic replacement of a lost link inter-layer link. In order to make ECMP link replacement transparent to the TRILL spine switches at layer-3, each spine switch 22A-22N is assigned the same MAC address and the same IP address in the ethernet OSI stack 40. This ensures that any layer-3 spine switch can properly handle communications from and layer-2 leaf switch. The use of ECMP hashing to activate only a single selected inter-layer link at a time from each layer-2 device to the layer-3 level prevents duplicate message routing at the layer-3. The resulting topology provides multipath connectivity between layer-2 and layer-3 utilizing only the ECMP protocol implemented on the layer-2 leaf switches 18A-18N without having to alter the TRILL protocol at the layer-3 spine switches 22A-22N. It should be noted that the ECMP protocol requires each newly connected TRILL spine switch at layer-3 to initialize communications with the newly connected layer-2 leaf switch, which prevents unauthorized connections to the network through the layer-3 level.

Figure 4:
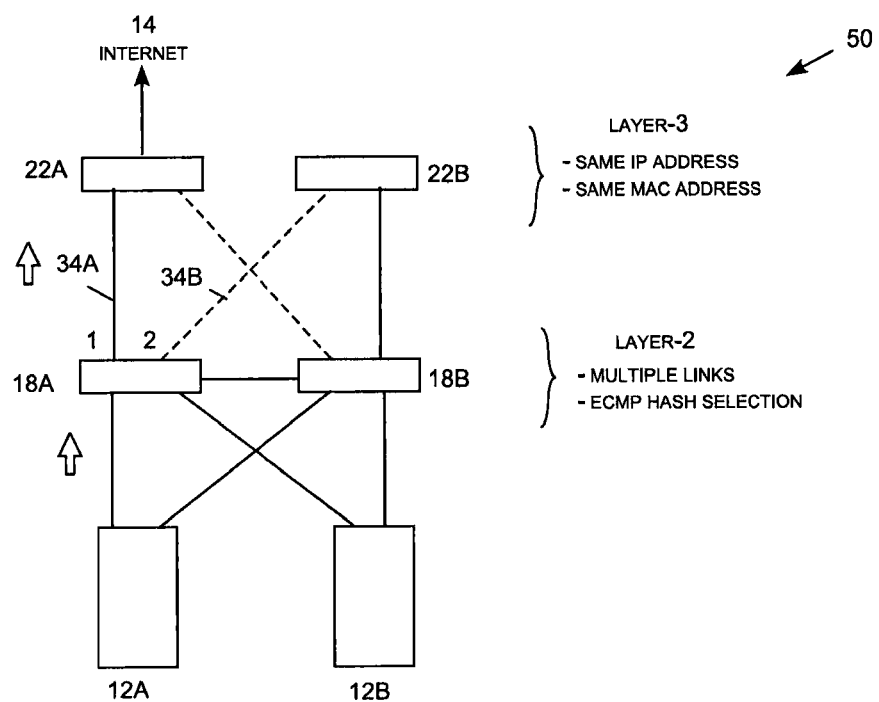
FIG. 4 depicts an illustrative network connection utilizing layer-2 leaf switches and layer-3 TRILL spine switches prior to a link failure ethernet topology in accordance with an embodiment.

FIG. 4 depicts an illustrative network connection 50 utilizing layer-2 leaf switches 18A-18B and layer-3 TRILL spine switches 22A-22B prior to an inter-layer link failure. This topology includes multiple links 34A, 34B between the layer-2 device 18A and layer-3 spine switches 22A, 22B, respectively. For example, the first inter-layer link 34A may connect port-1 of the leaf switch 18A to a first TRILL spine switch 22A, while the second inter-layer link 34B may connect port-2 of the leaf switch 18A to a second TRILL spine switch 22B. The spine switches 22A and 22B are both assigned the same IP address and the same MAC address to enable the leaf switch 18A to communicate with either spine switches without reconfiguration. In this example, ECMP hashing implemented by the layer-2 leaf switch 18A has initially selected port-1 to establish a data link between the layer-2 leaf switch 18A and the layer-3 TRILL spine switch 22A. The ECMP protocol also disables the second inter-layer link 34B whenever the first inter-layer link 34A is enabled to avoid multiple active inter-layer links from the layer-2 leaf switch 18A to layer-3. The layer-2 leaf switch 18A therefore uses the first inter-layer link 34A to transmits data packets to the layer-3 TRILL spine switch 22A using the MAC address or the IP address assigned to all of the layer-3 spine switches.

Figure 5:
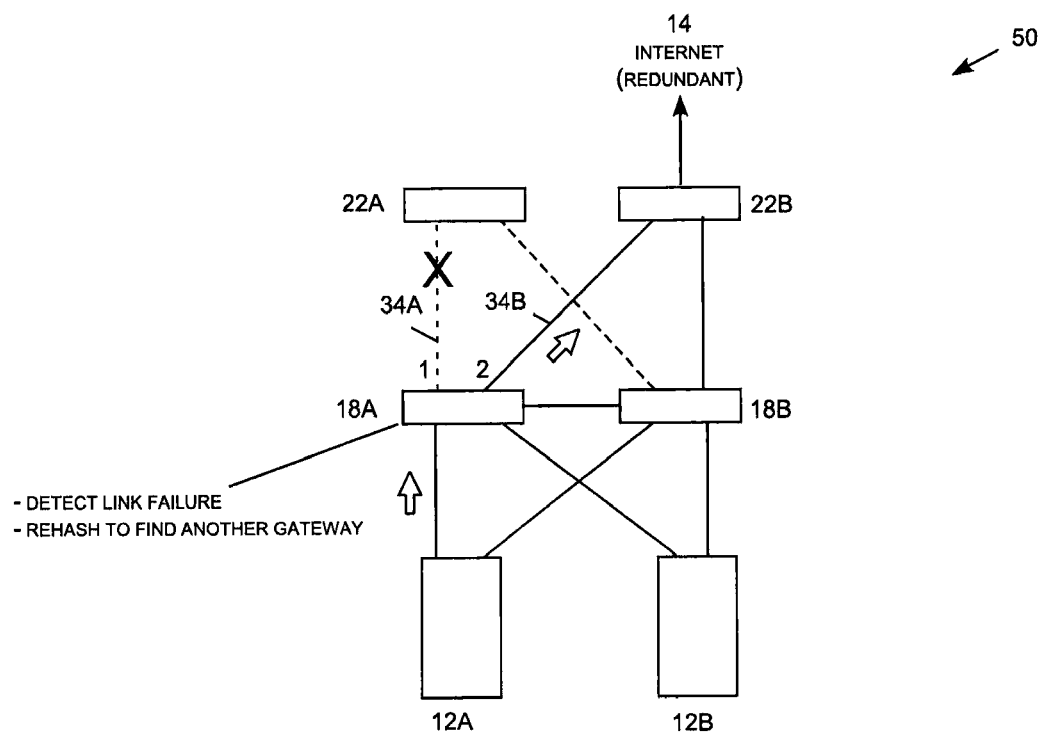
FIG. 5 depicts the illustrative network connection of FIG. 4 after a link failure ethernet topology in accordance with an embodiment.

FIG. 5 depicts the illustrative network connection 30 after a link failure on the connection between port-1 of the layer-2 device 18A and the layer-3 TRILL switch 22A. The layer-2 leaf switch 18A detects loss of the first inter-layer data link 34A and initiates ECMP running on the layer-2 device to compute a re-hash with the failed link (i.e., port-1) excluded from the list of potential gateway links to find an alternate available gateway. In this simplified example, the re-hash identifies the second liner-layer link 34B connected to port-2 since this is the only other gateway connected to the layer-2 device 18A. The ECMP protocol also disables any other inter-layer links connected to the layer-2 device 18A whenever the second inter-layer link 34B is enabled to avoid multiple active inter-layer links from the layer-2 leaf switch 18A to layer-3. The layer-2 leaf switch 18A therefore uses the second inter-layer link 34B to transmits data packets to the layer-3 TRILL spine switch 22B using the MAC address or the IP address assigned to all of the layer-3 spine switches.

While only two inter-layer links 34A-34B are illustrated for the leaf switch 18A, it will be appreciated that the ECMP protocol enables connection among any number of available alternate inter-level links. In each case, only one inter-layer link is enabled at any time and the same IP or MAC address is used to address packets to any layer-3 TRILL spine switch that may be connected to the leaf switch 18A. Although the layer-2 device 18A need not be reconfigured with new IP or MAC addresses to accommodate inter-layer link changes, and the layer-3 TRILL devices require no change to the standard TRILL protocol, the ECMP protocol does require the newly connected TRILL spine switch 22B to initialize communications with the newly connected layer-2 leaf switch 18A, which prevents unauthorized connections to layer-2 of the network 11 through the layer-3 level.

Figure 6:
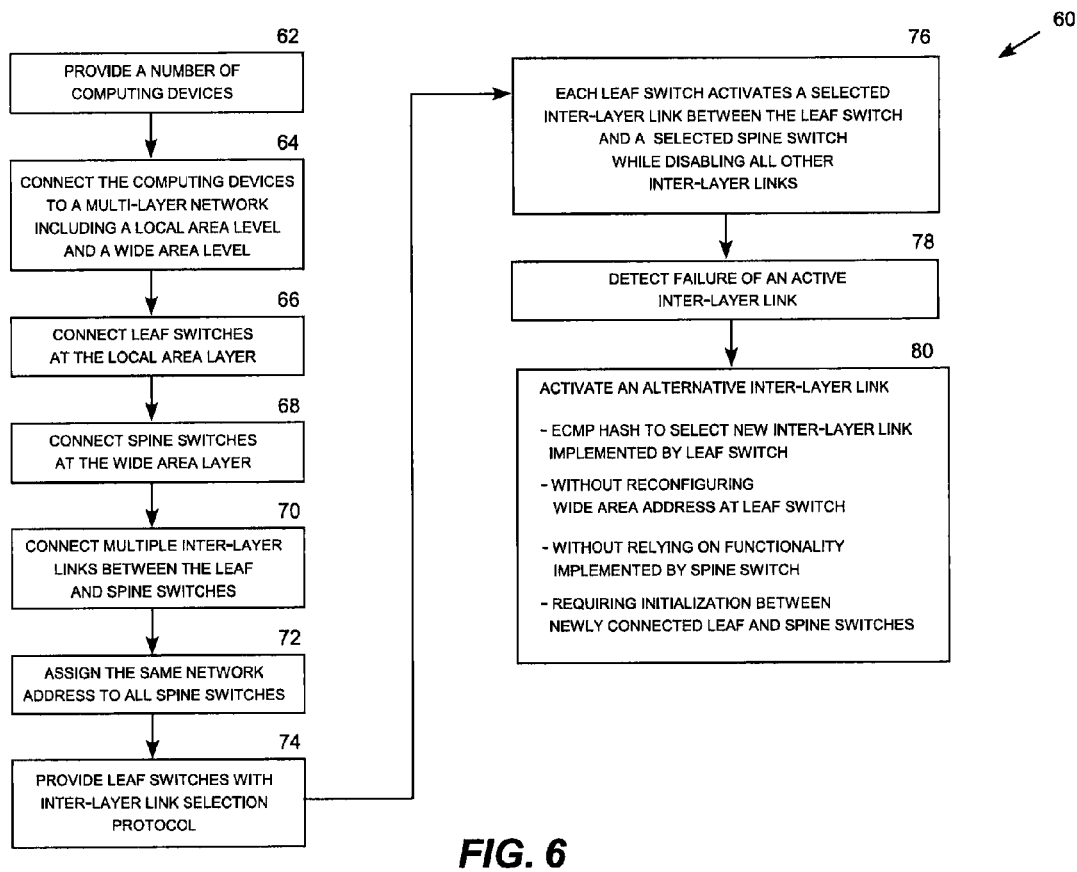
FIG. 6 is a logic flow diagram depicting configuration and operation of a multilevel network implementing multipath inter-layer redundancy in accordance with an embodiment.

FIG. 6 is a logic flow diagram 60 depicting configuration and operation of multipath inter-layer redundancy in the multilevel network 11 shown in FIG. 1 in accordance with an embodiment. In block 62, a number of computing devices, such as servers and workstations, are provided. In block 64, the computing devices are connected in a multilevel network that includes a local area layer and a wide area layer. In block 66, a number of leaf switches are configured at the local area layer to provide local area network access among the computing devices. In block 68, a number of spine switches are configured at the wide area layer to provide Internet access to the computing devices. In block 70, each leaf switch is connected to multiple spine switches to provide multiple inter-layer communication paths between the leaf switches of the local area layer and the spine switches. To allow each leaf switch to communicate with each spine switch without having to reconfigure the IP address maintained at the leaf switch, in block 72 each spine switch is assigned the same network address. In addition, to implement multipath redundancy between the local area and wide area layers, in block 74 each leaf switch is configured with an inter-layer link selection protocol to selectively connect only one active inter-layer link between the leaf switch and the wide area layer while disabling all other available inter-layer links between the leaf switch and the wide area layer.

In block 76, each leaf switch activates an active link between the leaf switch and a selected spine switch while disabling all other available inter-layer links between the leaf switch and the wide area layer. In block 76, a leaf switch detects a failure of an active inter-layer link. In block 80, the affected leaf switch activates an alternative inter-layer link between the particular leaf switch and the wide area layer while disabling all other available inter-layer links between the leaf switch and the wide area layer. For example, ECMP hashing is typically used to select the alternate inter-layer link to activate while disabling all of the non-selected alternative inter-layer links. The alternative inter-layer link is thus activated without requiring the leaf switch to be configured with a new address for the alternate inter-layer link or relying on any multipath functionality implemented within the wide area layer. However, the leaf switch typically requires initialization with the newly connected spine switch to prevent unauthorized access to the network through the wide area layer.

In the embodiments, each leaf switch may be a typical Ethernet router and each spine switch may be a typical Internet gateway. Each switch therefore has a processor, memory, network interface and other customary components. Similarly, each server may be a conventional workstation or other network computing device with a processor, memory, network interface and other customary components as known in the technology. No special software or hardware functionality other than as describe above is required to operate the embodiments as described.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for providing multipath connectivity between layers in a communication protocol, the system comprising:
   a plurality of computing devices implementing transparent interconnection of lots of links (TRILL) network connectivity at layer three;
   a multilevel network comprising a first network layer that includes a plurality of leaf switches, the multi-level network configured for providing local network access among the computing devices and a second network layer that includes a plurality of spine switches that provide access to the computing devices; and
   a plurality of inter-layer links that are configured for connecting each leaf switch to a plurality of the spine switches to provide multiple inter-layer communication paths between the leaf and spine switches,
   wherein all of the spine switches are assigned a common Internet protocol (IP) and media access control (MAC) address, and are thus associated with a common network gateway;
   wherein each leaf switch comprises an inter-layer link selection protocol that is configured for selectively connecting only one active inter-layer link between the leaf switch and the spine switch while disabling all other available inter-layer links between the leaf switch and the spine switch;
   wherein, in response to detecting a failure of an active inter-layer link, each leaf switch is configured to activate an alternative inter-layer link between the leaf switch and the spine switch while disabling all other available inter-layer links between the leaf switch and the spine switches without reconfiguring the leaf switch with a new address for the alternate inter-layer link or relying on multipath functionality implanted within the spine switch.

2. The system of claim 1, wherein each leaf switch requires initialization of a newly connected spine switch prior to addressing communications to the newly connected spine switch over the alternative inter-layer link.

3. The system of claim 1, wherein each spine switch implements a TRILL protocol to avoid bridge loops.

4. The system of claim 1, wherein each leaf switch implements an equal cost multipath (ECMP) protocol by the leaf switches to select active inter-layer links between the leaf and spine switches.

5. The system of claim 1, wherein the multilevel network comprises an ethernet configured in accordance with a multi-layer ethernet protocol, the leaf switches comprises local area network routers configured at layer-2 of the ethernet protocol, and the spine switches comprise Internet gateways configured at layer-3 of the ethernet protocol.

* * * * *